United States Patent
Raynaud et al.

(10) Patent No.: US 9,139,289 B2
(45) Date of Patent: Sep. 22, 2015

(54) METHOD FOR THE AUTOMATIC MONITORING OF AIR OPERATIONS NECESSITATING GUARANTEED NAVIGATION AND GUIDANCE PERFORMANCE

(71) Applicant: AIRBUS OPERATIONS (SAS), Toulouse (FR)

(72) Inventors: Sylvain Raynaud, Cornebarrieu (FR); Arnaud Nicolas, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 138 days.

(21) Appl. No.: 13/682,511

(22) Filed: Nov. 20, 2012

(65) Prior Publication Data

US 2013/0184899 A1  Jul. 18, 2013

(30) Foreign Application Priority Data

Dec. 6, 2011 (FR) ...................................... 11 61189

(51) Int. Cl.
*G01C 23/00* (2006.01)
*B64C 19/00* (2006.01)
*G05B 9/03* (2006.01)
*G05D 1/00* (2006.01)

(52) U.S. Cl.
CPC . *B64C 19/00* (2013.01); *G05B 9/03* (2013.01); *G05D 1/0077* (2013.01)

(58) Field of Classification Search
USPC ................................ 701/3, 7, 14, 17; 340/979
See application file for complete search history.

(56) References Cited

U.S. PATENT DOCUMENTS

2003/0195672 A1* 10/2003 He ..................................... 701/3
2007/0299568 A1* 12/2007 Rouquette et al. ................ 701/3

(Continued)

FOREIGN PATENT DOCUMENTS

EP  2 216 244  8/2010

OTHER PUBLICATIONS

French Search Report and Written Opinion for Application No. 1161189 dated May 21, 2012.

*Primary Examiner* — Helal A Algahaim
*Assistant Examiner* — Michael Fouche
(74) *Attorney, Agent, or Firm* — Jenkins, Wilson, Taylor & Hunt, P.A.

(57) ABSTRACT

A method is disclosed for automatic monitoring of a flight management assembly of an aircraft implementing air operations necessitating guaranteed navigation and guidance performance, wherein flight path data generated by first and second flight management systems respectively, are compared in order to check their consistency; first and second flight management systems transmit their flight path data to a third flight management system; the third flight management system receives a current position of the aircraft, calculates deviations between this current position and a flight path depending on the flight path data received from the first and second flight management systems, which it utilizes only if they are identical, and calculates, according to these deviations, guidance commands for slaving onto this flight path. Monitoring can compare deviations and guidance commands received from the first second and third flight management systems in order to be able to detect an inconsistency between them.

8 Claims, 1 Drawing Sheet

(56) References Cited

U.S. PATENT DOCUMENTS

2009/0259351 A1* 10/2009 Wachenheim et al. ............ 701/7
2011/0060483 A1* 3/2011 Gine I Cortiella et al. ....... 701/3
2011/0106345 A1* 5/2011 Takacs et al. .................... 701/17
2011/0276199 A1* 11/2011 Brot ................................. 701/3
2012/0173052 A1* 7/2012 Nicolas et al. .................... 701/3
2012/0253564 A1* 10/2012 Noll et al. ........................ 701/14

* cited by examiner

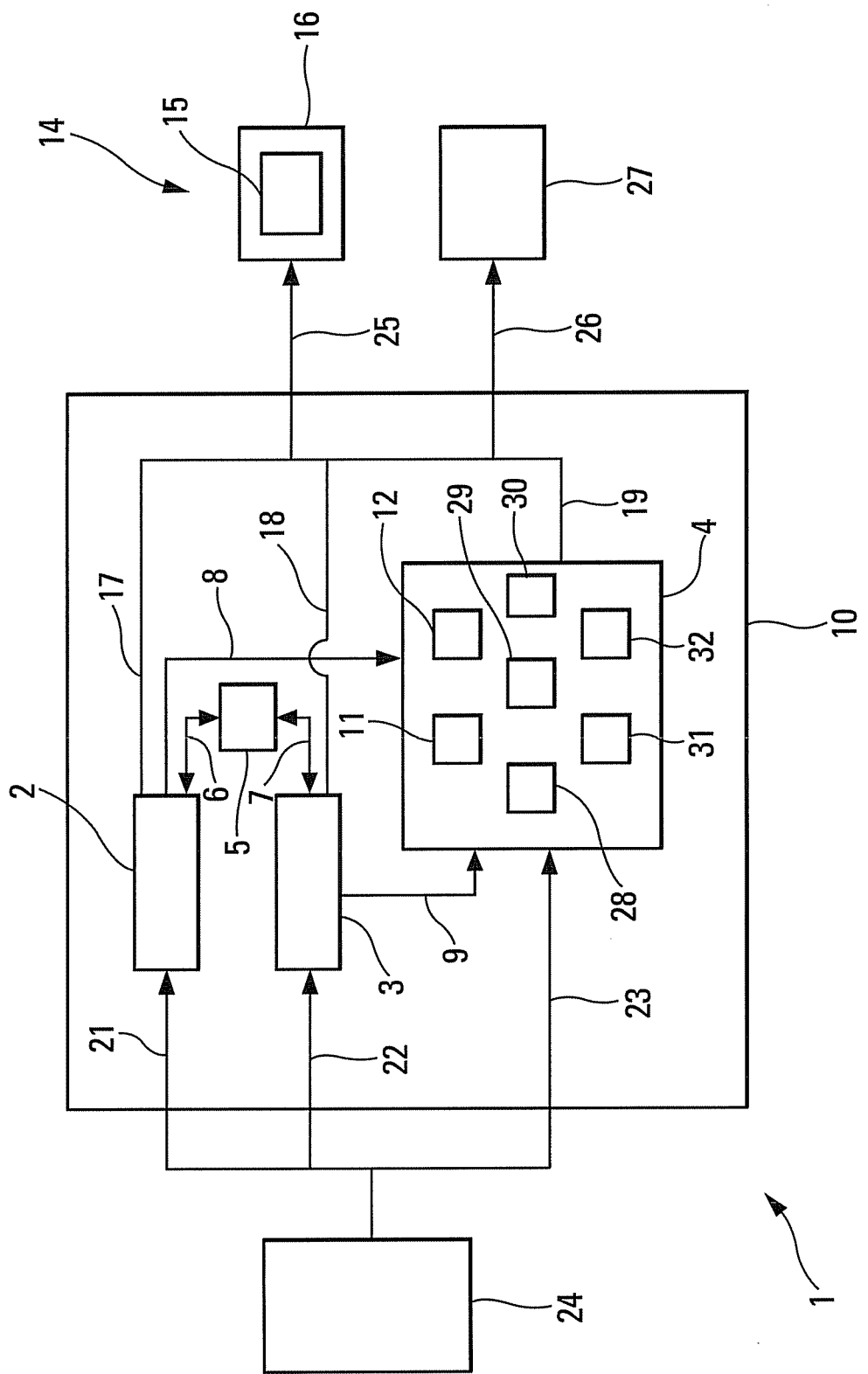

METHOD FOR THE AUTOMATIC MONITORING OF AIR OPERATIONS NECESSITATING GUARANTEED NAVIGATION AND GUIDANCE PERFORMANCE

CROSS-REFERENCE TO RELATED APPLICATION

This U.S. non-provisional patent application claims priority under 35 U.S.C. §119 of French Patent Application No. 20110061189 filed on Dec. 6, 2011, the entire contents of which are hereby incorporated by reference.

The present invention relates to a method for the automatic monitoring of a flight management assembly of an aircraft, in particular of a transport aircraft, implementing air operations necessitating guaranteed navigation and guidance performance, as well as to such a flight management assembly.

Although not exclusively, the present invention applies more particularly to RNP AR (Required Navigation Performance with Authorization Required) operations. These RNP AR operations are based on surface navigation of the RNAV (aRea NAVigation) type and on operations having RNP (Required Navigation Performance) performance. They have the feature of necessitating special authorization in order to be able to be operated or flown by an aircraft.

RNAV navigation makes it possible for an aircraft to fly from waypoint to waypoint and not from ground station to ground station (radio navigation means of the NAVAID type).

It is known that the RNP concept corresponds to surface navigation for which are added (on board the aircraft) monitoring and warning means which make it possible to ensure that the aircraft remains in a corridor, called RNP, around a reference flight path and which authorize the taking into account of curved flight paths. Relief or other aircraft are potentially outside of this corridor. The performance required for an RNP operation is defined by an RNP value which represents the half-width (in nautical miles: NM) of the corridor around the reference flight path, within which the aircraft must remain 95% of the time during the operation. A second corridor (around the reference flight path) having a half-width of twice the RNP value is also defined. The probability of the aircraft leaving this second corridor must be less than $10^{-7}$ per hour of flight.

The concept of RNP AR operations is still more restrictive. The RNP AR procedures are in fact characterized by:
  RNP values:
    which are less than or equal to 0.3 NM on approach, and which can drop down to 0.1 NM; and
    which are strictly less than 1 NM at the start of and during a go-around, and which can also drop down to 0.1 NM;
  a final approach segment which can be curved; and
  obstacles (mountains, traffic, . . . ) which can be situated at twice the RNP value with respect to the reference flight path whereas, for usual RNP operations, an additional margin with respect to obstacles is provided.

The air authorities have defined a TLS (Target Level of Safety) of $10^{-7}$ per operation, whatever its type may be. In the case of RNP AR operations, as the RNP values can drop down to 0.1 NM and the obstacles can be situated at twice the RNP value from the reference flight path, this objective results in a probability that the aircraft leaves the corridor of half width D=2.RNP which must not exceed $10^{-7}$ per procedure.

The items of equipment installed on board aircraft (flight management system, inertial system, means of updating GPS data and guidance means of the automatic pilot), as well as the usual architecture, do not make it possible to achieve the desired safety level if operational mitigation means are not provided, in particular for the detection and management of possible failures. That is why special authorization is required for this type of operation, in order to ensure that the operational procedures and the training of pilots make it possible to achieve the desired safety level. Moreover, as the crew must take charge of certain failures, aircraft are not at present capable of guaranteeing an RNP value of 0.1 NM during a failure, because the crew is not capable of maintaining the performance requirements during manual piloting.

On present-day aircraft, the monitoring of RNP AR operations is carried out by means of two usual functions, namely:
  a first function which monitors the accuracy and the integrity of the calculation of position; and
  a second function which allows the crew to monitor the guidance of the aircraft.

As mentioned above, present day aircraft are not capable of guaranteeing an RNP value of 0.1 NM during a failure and the crew has to be specially trained to fly the RNP AR procedures. The crew must, in fact, be capable of detecting and adequately dealing with the failures that are likely to. compromise the operation in progress.

The objective for future aircraft is to have the capability of flying the RNP AR procedures with RNP values down to 0.1 NM and to do so without restriction (in a normal situation and in the case of a failure) during departure, approach and go-around. In order to do this, the crew must no longer be considered as the principal means of detection and treatment of failures.

Moreover, an aircraft is generally provided with a flight management assembly, which is responsible for managing the flight plan, calculating the flight path and deviations/guidance commands and which operates nominally with two frontal flight management systems (pilot side and co-pilot side) of the FMS (Flight Management System) type, which allow the crew to manage its flight. Such a usual architecture of a flight management assembly is not compatible with the conduct of air operations necessitating guaranteed navigation and guidance performance.

It will be noted that such a flight management assembly can, in a usual architecture, comprise a third flight management system. However, this third system is a back-up system which is solely provided to compensate for a total loss of one of the two operational frontal systems.

The purpose of the present invention is to overcome the abovementioned disadvantages. It relates to a method for the automatic monitoring of a flight management assembly of an aircraft implementing air operations necessitating guaranteed navigation and guidance performance. The present invention applies to a flight management assembly comprising a first flight management system and a second flight management system, which are independent, which, in use, allow the pilots to manage the flight plan of the aircraft and generate deviations and guidance commands, as well as a third flight management system.

For this purpose, according to the invention, the said method for the automatic monitoring of the said flight management assembly is noteworthy in that:
a) flight path data (either at least a part of the flight plan, or the flight plan directly, depending on the embodiment in question), which are generated by the said first and second flight management systems respectively, are compared with each other in order to check their consistency;
b) the said first and second flight management systems transmit their flight path data to the said third flight management system;

c) the said third flight management system receives a current position of the aircraft, calculates deviations between this current position of the aircraft and a flight path depending on the said received flight path data, which it takes into account only if they are identical, and calculates, according to these deviations, guidance commands for slaving onto this flight path; and d) monitoring means are provided which compare the deviations and guidance commands received from the said first second and third flight management systems with each other in order to be able to detect an inconsistency between them. When there is detection of such an inconsistency arising from a failure, the monitoring means are capable of identifying (from among the said first, second and third flight management systems) the system responsible for the failure and to no longer take it into account, at least for as long as the RNP AR operation in progress remains in use.

Thus, thanks to the invention, an architecture of the triplex type is obtained which is applied to the sub-functions of the flight management assembly participating in the guidance system: management of the flight plan, calculation of the flight path and calculation of the deviations/guidance commands for following the flight path. This triplex architecture makes it possible to meet the requirements relating to operations necessitating guaranteed navigation and guidance performance, as described in detail below.

In particular:
the said third flight management system is formed in such a way as to be able to calculate deviations and guidance commands and, possibly, to manage a flight plan and to determine a flight path. Consequently, the three flight management systems are operational during the flight and are capable of providing all the data necessary for the guidance and navigation of the aircraft, at least when the latter is flying an operation of the "RNP AR" type; and monitoring and comparison means, described in detail below, are placed between the three flight management systems. Consequently, each of them independently provides all of the information useful to the aircraft's guidance system.

In a preferred embodiment, the present invention is applied to a usual flight management assembly comprising only two flight management systems which allow the pilots to manage the flight plan of the aircraft, the third flight management system being a back-up system deprived, in particular, of means of dialogue with a pilot. In this preferred embodiment, in order to allow the implementation of the invention, the said third system is adapted, in particular by adding means to it making it possible to implement the aforesaid step c).

In this way an asymmetrical triplex architecture is obtained, the three systems not being identical. This asymmetrical triplex architecture provides robustness in the presence of any simple failure and thus becomes compatible with the conduct of air operations necessitating guaranteed navigation and guidance performance.

The said third flight management system can also be a supplementary system which is specially provided for the implementation of the present invention.

The present invention is preferably applied to the monitoring of the lateral (horizontal plane) guidance of the aircraft, but it can also be applied to the monitoring of the vertical (vertical plane) guidance.

Moreover, in a preferred embodiment, the said flight path data correspond to at least a part of the flight plan of the aircraft. In this case, the said third flight management system determines the said flight path from this received part of the flight plan and from information coming from an integrated database. In this case, it must be capable of carrying out the following operations:
reading a navigation database and extracting the useful data from it;
sequencing a flight plan;
determining a flight path flyable by the aircraft (calculation of transitions between the segments);
acquiring the current position of the aircraft; and
calculating the guidance commands and the deviations (preferably lateral) with respect to this flight path.

In a simplified embodiment, it can also be considered that the said flight path data correspond directly to the flight path of the aircraft, such that the third flight management system does not have to carry out the preceding first three operations.

Moreover, advantageously:
in step b), the transmission of at least a part of the said flight path data is protected by a CRC (Cyclic Redundancy Check) check; and/or
in step c), the said third flight management system checks the consistency of the received data with respect to recorded data, preferably that which has not been transmitted in a protected manner; and/or
an update of flight plan data in the third flight management system is carried out by the intermediary of at least one of the said first and second flight management systems.

Moreover, advantageously, if the flight path data compared in step a) are different (not identical), the monitoring means detect an inconsistency between the data generated by the said first and second flight management systems.

In the context of the present invention, the monitoring according to the invention can be permanently active. However, this monitoring can also be in an inactive state and be activated if necessary. In this case, the activation of the operations carried out in steps a) to d) can be implemented:
automatically, when special criteria, for example relating to the configuration of the aircraft and to the current values of flight parameters, are complied with; and/or
manually by an operator, using a man/machine interface.

The automatic monitoring according to the invention is particularly suitable for the RNP context, but can be extended to any flight necessitating a high level of integrity, of robustness in the presence of failures and of monitoring, for following a flight plan.

The present invention also relates to an aircraft comprising a flight management assembly. The flight management assembly implementing air operations necessitating guaranteed navigation, and guidance performance and comprising a first flight management system and a second flight management system, which are independent, and which, in use, manage a flight plan of the aircraft and generate deviations and guidance commands, as well as a third flight management system.

According to the invention, the said flight management assembly is noteworthy in that:
the said first or second flight management system compares flight path data generated by the said first and second flight management systems respectively with each other, these flight path data being transmitted by the said first and second flight management systems to the said third flight management system; and the said third flight management system comprises at least means for receiving a current position of the aircraft, means for calculating deviations between this current position of the aircraft and a flight path dependent on the said received flight path data, which are taken into account only if they are identical, and means for calculating, according to these deviations, guidance commands for slaving onto this flight path; and the said flight management assembly furthermore comprises means of monitoring for comparing the deviations and the guidance commands, received from the said first, second and third flight management systems respectively, with each other in order to be able to detect an inconsistency between them.

A triplex architecture is thus obtained, preferably of the asymmetrical type.

The single FIGURE of the appended drawing will give a good understanding of how the invention can be embodied. This single FIGURE is the block diagram of a flight management assembly according to the invention.

The assembly 1 according to the invention and shown diagrammatically in the FIGURE is a flight management assembly of an aircraft (not shown), in particular of a transport aircraft, which is likely to implement air operations necessitating guaranteed navigation and guidance performance.

The said flight management assembly 1 which is responsible, in a usual way, in particular for the management of the flight plan and for the calculation of the flight path and of deviations and guidance commands, comprises a unit 10. This unit 10 comprises in particular:

a first usual flight management system 2 which makes it possible for the pilot of the aircraft to manage the flight plan of the said aircraft and which calculates, in particular, deviations and guidance commands; and a second usual flight management system 3 which makes it possible for the co-pilot of the aircraft to manage the flight plan of the said aircraft and which calculates, in particular, deviations and guidance commands. These two flight management systems 2 and 3, called "frontal", are of the FMS (Flight Management System) type.

In a preferred embodiment, the present invention is applied to a usual flight management assembly 1 which furthermore comprises, in the unit 10, a third flight management system 4 which is a back-up system deprived, in particular, of means of dialogue with the crew. This system 4 is not therefore accessible by the crew which cannot therefore interact with it. Thus, such a system 4 cannot have access to the flight plan via a manual input by the crew and it is used solely to replace one of the two operational systems 2 and 3 in the case of a total loss of one of these systems 2 and 3.

In a usual manner, the said flight management assembly 1 also comprises the following means, not specifically shown:

a set of information sources, which in particular provide, in a usual manner, the flight plan of the aircraft and the current values of flight parameters relative to the flight of the aircraft and to its environment;

at least one database which contains navigation data and information relative to an RNP procedure; and a man/machine interface.

According to the invention, the said flight management assembly 1 is such that:

the unit 10 furthermore comprises means 5 for comparing flight path data, generated by the said flight management systems 2 and 3 respectively and received though the links 6 and 7 respectively, with each other. These means 5 can, for example, be integrated into one of the said flight management systems 2 and 3. The said flight management systems 2 and 3 transmit these flight path data by the intermediary of links 8 and 9 respectively to the said flight management system 4;

the said flight management system 4 comprises at least:
means 11 for acquiring a current position of the aircraft; and
means 12 for calculating deviations between this current position of the aircraft and a flight path depending on the said received flight path data, which are taken into account only if they are identical, as explained in detail below, and for calculating, according to these deviations, guidance commands for slaving onto this flight path; and the said flight management assembly 1 furthermore comprises a monitoring system 14 which comprises monitoring means 15 for comparing the deviations and the guidance commands, received from the said flight management systems 2, 3, and 4 respectively, with each other in order to be able to detect an inconsistency.

When such an inconsistency is detected which results from a failure, the monitoring means 15 are capable of identifying, from among the said flight management systems 2, 3, and 4, the system which is responsible for the failure and of no longer taking it into account at least as long as the RNP AR operation in progress continues being implemented.

Thus, the said flight management assembly 1 according to the invention has triplex architecture which is applied to the sub-functions of this assembly participating in the guidance system: management of the flight plan, calculation of the flight path and calculation of the deviations/guidance commands in order to follow the flight path, as explained below. This triplex architecture makes it possible to meet the requirements relating to air operations necessitating guaranteed navigation and guidance performance.

In particular:

the said flight management system 4 is formed in such a way as to be able to calculate deviations and guidance commands and, possibly, to manage a flight plan and determine a flight path. Consequently, the three flight management systems 2, 3 and 4 are operational during the flight and are capable of providing all, the data necessary for the guidance and navigation of the aircraft, at least when the latter is flying an operation of the "RNP AR" type; and a monitoring and comparison system 14 is placed between the three flight management systems 2, 3 and 4. Preferably, the means 15 of this system 14 are integrated in a flight commands calculator 16 which is connected by the intermediary of links 17, 18 and 19 respectively to the said systems 2, 3 and 4. Consequently, each of them independently provides all of the information useful to the guidance system of the aircraft.

In the abovementioned preferred embodiment, based on a usual assembly 1 (with a back-up system 4), it is impossible to set up a so-called "symmetrical" architecture, in which three identical systems all carry out the same operations at the same time. Also, in this preferred embodiment, the said system 4 is adapted, as described below, in order that it is able to carry out the operations necessary for the implementation of the present invention. It should be noted that the specificity of this third system 4 procures increased reliability in the case of a software failure affecting the two frontal systems 2 and 3 simultaneously. In fact, as the code of the system 4 is different, the probability that this system is also affected by such a failure is decreased.

An asymmetrical triplex architecture is thus obtained, the three systems 2, 3 and 4 not being identical. This asymmetrical triplex architecture provides robustness in the presence of any simple failure and thus becomes compatible with the conduct of air operations necessitating guaranteed navigation and guidance performance.

During the conduct of "RNP AR" operations, monitoring of the navigation and guidance system is implemented (via the monitoring system 14) in order to detect any failure able to result in leaving the corridor in which the aircraft must be maintained. This maintaining necessitates a monitoring of the lateral guidance (in a horizontal plane) of the aircraft. Consequently, from the start of the "RNP AR" operation, the system 4 must be capable of calculating, in an autonomous manner, the flight path of the aircraft and the associated lateral deviations and guidance commands. As long as the "RNP AR" operation is in progress, the system 4 continuously ensures the sending of these parameters to the flight commands calculator 16 in order to allow the latter to carry out the monitoring and to detect a possible failure, via the means 15.

It should be noted that not all of the functions of an FMS system are activated in the back-up mode of the system 4. Thus, in particular, the said system 4:
- cannot be directly updated by the crew via a usual man/machine interface;
- does not calculate predictions along the flight path; and
- does not calculate a vertical profile or the associated deviations and commands.

It will be noted that, in the context of the present invention, the said flight management system 4 can also be a new system which is especially dedicated to the implementation of the present invention.

In the architecture shown in the single FIGURE:
- each system 2, 3 and 4 retrieves, via a link 21, 22, 23, the current position of the aircraft, consolidated by an inertial reference system 24 integrating the functions of the pitot-static system, of the ADIRS (Air Data and Inertial Reference System) type, in order to be able to sequence its flight plan according to the current position of the aircraft;
- each system 2, 3 and 4 calculates the deviations and the guidance commands and sends them:
  - via a link 25 (connected to the links 17, 18 and 19) to the flight commands calculator 16 (for an automatic monitoring by the intermediary of the means 15); and
  - via a link 26 (also connected to the links 17, 18 and 19) to display means 27, of the CDS (Control Display System) type, for visual monitoring carried out by the crew;
- the systems 2 and 3 send the flight plan data to the system 4, these data being protected by a CRC (Cyclic Redundancy Check) check; and
- an "FPLN+CRC" function allows the system 4:
  - to have a flight plan identical to that of the systems 2 and 3;
  - to have all the data for calculating deviations and consistent guidance commands, these items of information being sent to the means 16 and 27; and
  - to prevent a failure resulting in an incorrect flight plan value in one of the systems 2 and 3 from being propagated to the said system 4.

The present invention guarantees that the slightest failure is detected by the monitoring system 14 (comprising in particular the means 15, 5, 31, 32) and that the responsible system 2, 3, 4 is identified and eliminated from the navigation system. Thus:
- if the flight plans of the systems 2 and 3 are different (for whatever reason) and if the difference affects an "RNP AR" portion, the link between these systems 2 and 3 is broken in order to prevent propagation of the failure;
- if the systems 2 and 3 send different data to the system 4, the latter detects this by the "FPLN+CRC" function and it does not accept this data as long as the difference persists; and
- as the deviations and the guidance commands are constantly sent to the means 15 by the three systems 2, 3 and 4, the latter can detect a failure and identify and eliminate the responsible system.

It is also possible to provide warning means intended to issue at least one warning (visual or sound) in the cockpit of the aircraft in the case of detection of a failure.

The present invention is preferably applied to the monitoring of the lateral (horizontal plane) guidance, but it can be envisaged that it could also be applied to the monitoring of the vertical (vertical plane) guidance.

Moreover, in a preferred embodiment, the said flight path data correspond to at least a part of the flight plan of the aircraft. In this case, the said system 4 determines the said flight path from this part of the flight plan and from information coming from an integrated database. For this purpose, it comprises:
- means 28 for reading a navigation database and for extracting the useful data from it;
- means 29 for sequencing a flight plan; and
- means 30 for determining a flight plan flyable by the aircraft (calculation of the transitions between the segments).

In a simplified embodiment, the flight path data transmitted by the systems 2 and 3 to the system 4 correspond directly to the flight path of the aircraft, such that it is not necessary for the system 4 to comprise the said means 28, 29 and 30. This simplified embodiment thus makes it possible to dispense with the need for a navigation database and the capability of managing a flight plan and of constructing a flight path, which makes it possible to move the simple functionalities (necessary for the implementation of the invention) into another pre-existing avionic system in particular in order to obtain a weight saving.

Preferably, the transmission of at least a part of the flight path data, and in particular of the flight plan, is protected by a CRC (Cyclic Redundancy Check) check. Thus, the system 4 receives from one of the systems 2 and 3 a part of the flight plan and the corresponding CRC code, and from the other system the CRC code, it compares (using the means 31) the two codes and it refuses the update of its flight plan in the case of difference between these two codes.

The said system 4 furthermore comprises means 32 for checking the consistency of data (received and not protected by a cyclic redundancy check) with respect to data recorded in its navigation database. These means 32 can be used not only for comparing certain values encoded in the database with the received content but also for comparing a received flight path with the content of the database (this consists in comparing a skeleton flight plan and a flight path) in order to make it possible to check the consistency of the final calculated flight path with the initial information encoded in the database (for example in order to be free of flight path computation errors).

In the context of the present invention, a series of logics specific to the functioning of the system 4 is installed in order to allow it to provide its functions:

A/definition/sending by the frontal systems 2 and 3 of a specific flight plan subpart.

The transmission of the complete flight plan to the system 4 being voluminous and long, only a part is selected for sending in a regular manner;

B/securing the sending of the flight plan from the frontal systems 2 and 3 to the system 4 by partial CRC, and comparison of a part of the data with the navigation database of the system 4.

The comparison of the content of the flight "sub-plan" to be sent by the frontal systems 2 and 3 is carried out before the sending. This comparison is carried out by CRC, except for continuously varying parameters with very high accuracies (a very slight difference between the frontal systems 2 and 3 is likely to appear and the CRC check would not therefore succeed). Only a subpart of the flight sub-plan is therefore protected by CRC and compared. The remaining part is transmitted to the system 4 as it is.

When the flight sub-plan is received, the system 4 carries out two operations. Firstly, it carries out (by the means 31) a verification of the content protected by CRC. Then, for the unprotected content, it carries out (by the means 32) a checking of the consistency of the flight plan information with respect to its own database;

C/specific conditions for updating the flight plan of the system 4 by the frontal systems 2 and 3.

As only a part of the flight plan is sent to the system 4, a regular update must be carried out. In the case of loss of consistency between the content of the flight plan of the frontal systems 2 and 3 and that of the system 4, if the loss is due to an updating of the flight plan by the pilots, the system 4 detects this inconsistency and considers its content as obsolete as long as a new reception from the frontal systems 2 and 3 has not taken place. The conditions for updating the content of the system 4 by the frontal systems 2 and 3 can be optimized to cover only the changes or only the short-term changes (close to the present position of the aircraft);

D/conditions for reconfiguration of system 4 as an operational frontal system.

In the case of a loss of a frontal system, the system 4 can either remain in a back-up system configuration or it can be reconfigured as an operational frontal system.

In the case of a simultaneous double loss of the frontal systems 2 and 3, the system 4 detects this and remains in back-up configuration and then takes charge of the lateral guidance of the aircraft until the end of the procedure. As the system 4 does not have a flight path display function, in the case where it is guiding the aircraft, the displayed flight path comes from display systems which have stored the last flight path received through the frontal systems 2 and 3.

In the context of the present invention, the monitoring provided can be continuously active. However, this monitoring can also be inactive initially and can be activated if necessary. Such activation can be implemented:

automatically, as soon as the aircraft is in a restricted environment and must fly an "RNP AR" operation. In this case all of the architecture and the associated monitoring algorithms are automatically activated. The deactivating of the architecture is carried out automatically as soon as the aircraft leaves the restricted environment. Consequently, this operation is transparent to the crew which is warned only in the case of a failure, in order that it can react according to the operational procedures; and manually by an operator, a pilot in particular, using a man/machine interface (not shown specifically), preferably by means of a screen page allowing the crew to interact with the assembly 1. The monitoring can be deactivated in a similar manner.

The architecture and the different monitoring functions, described above, make it possible for the aircraft to conform with the safety requirements inherent in RNP AR operations, whilst being capable of detecting and automatically identifying a failing system.

The asymmetrical triplex architecture according to the invention can be applied to air operations of the RNP type, but it can also be used for any flight part necessitating a high level of integrity, of robustness in the presence of failures and of monitoring, in order to follow a flight plan. For example, it can be used for operations in a mountainous environment for which RNP procedures have not been created. This is even more true as the system 4 is not activated only in an RNP AR context; it is active throughout the flight even if it is not necessarily used and/or monitored by the RNP monitoring means.

The invention claimed is:

1. A method for automatic monitoring of a flight management assembly of an aircraft implementing air operations necessitating guaranteed navigation and guidance performance, the flight management assembly comprising a first flight management system and a second flight management system, which are independent, and which, in use, allow pilots of the aircraft to manage a flight plan of the aircraft and generate deviations and guidance commands, the flight management assembly comprising a third flight management system, the third flight management system comprising a back-up system deprived of an ability to dialogue with the pilots, such that the third flight management system is prevented from accessing the flight plan, wherein:
a) flight path data generated by the first and second flight management systems respectively, are compared in order to check their consistency;
b) the first and second flight management systems transmit their flight path data to the third flight management system;
c) the third flight management system receives a current position of the aircraft, calculates deviations between this current position of the aircraft and a flight path depending on the flight path data received from the first and second flight management systems, which it takes into account only if they are identical, and calculates, according to these deviations, guidance commands for slaving onto this flight path; and
d) a monitoring system comprising monitoring architecture and associated monitoring algorithms compares the deviations and guidance commands received from the first second and third flight management systems in order to detect an inconsistency between them, the monitoring system being configured to identify which system is responsible for the inconsistency so that its data is no longer taken into account where the inconsistency is detected.

2. The method according to claim 1,
wherein, in step b), the transmission of at least a part of the flight path data is protected by a cyclic redundancy check.

3. The method according to claim 1,
wherein the flight path data correspond to the flight path of the aircraft.

4. The method according to claim 1,
wherein the flight path data correspond to at least a part of the flight plan of the aircraft and in that the third flight management system determines the flight path from this part of the flight plan and from information coming from an integrated database.

5. The method according to claim 1,
wherein, in step c), the third flight management system checks the consistency of the received data with respect to recorded data.

6. The method according to claim 1,
wherein, if the flight path data compared in step a) are different, the monitoring system detects an inconsistency between the data generated by the first and second flight management systems.

7. The method according to claim 1,
wherein an update of flight plan data in the third flight management system is carried out by intermediary of at least one of the first and second flight management systems.

8. An aircraft, comprising a flight management assembly, the flight management assembly implementing air operations necessitating guaranteed navigation and guidance performance, and comprising a first flight management system and a second flight management system, which are independent, and which, in use, allow pilots of the aircraft to manage a flight plan of the aircraft and which generate deviations and guidance commands, the flight management assembly comprising a third flight management system, the third flight management system comprising a back-up system deprived of an ability to dialogue with the pilots, such that the third flight management system is prevented from accessing the flight plan, wherein:

the first or second flight management system configured to compare flight path data, generated by the first and second flight management systems respectively, these flight path data being transmitted by the first and second flight management systems to the third flight management system;

the third flight management system configured to receive a current position of the aircraft, configured to calculate deviations between this current position of the aircraft and a flight path dependent on the received flight path data, which are taken into account only if they are identical, and configured to calculate, according to these deviations, guidance commands for slaving onto this flight path; and the flight management assembly configured to compare the deviations and the guidance commands, received from the first, second and third flight management systems respectively, in order to be able to detect an inconsistency between them, the flight management assembly being configured to identify which system is responsible for the inconsistency so that its data is no longer taken into account where the inconsistency is detected.

\* \* \* \* \*